United States Patent
Zhang et al.

(10) Patent No.: US 9,024,965 B2
(45) Date of Patent: May 5, 2015

(54) DETERMINING A LAYOUT OF GRAPHIC OBJECTS ACCORDING TO A LAYOUT DENSITY MAP

(75) Inventors: Xuemei Zhang, Mountain View, CA (US); Daniel R. Tretter, San Jose, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 442 days.

(21) Appl. No.: 13/501,269

(22) PCT Filed: Oct. 28, 2009

(86) PCT No.: PCT/US2009/062401
§ 371 (c)(1),
(2), (4) Date: Apr. 11, 2012

(87) PCT Pub. No.: WO2011/053287
PCT Pub. Date: May 5, 2011

(65) Prior Publication Data
US 2012/0200590 A1    Aug. 9, 2012

(51) Int. Cl.
*G09G 5/02* (2006.01)
*G06T 11/60* (2006.01)
*G06F 3/12* (2006.01)

(52) U.S. Cl.
CPC .............. *G06T 11/60* (2013.01); *G06F 3/125* (2013.01)

(58) Field of Classification Search
None
See application file for complete search history.

(56) References Cited

U.S. PATENT DOCUMENTS

| 6,636,648 B2* | 10/2003 | Loui et al. ............... 382/284 |
| 6,636,650 B1* | 10/2003 | Long et al. ............... 382/295 |
| 2002/0051208 A1 | 5/2002 | Venable |
| 2004/0109201 A1 | 6/2004 | Teraue |
| 2006/0031801 A1* | 2/2006 | McIntyre et al. ............ 716/8 |
| 2006/0109510 A1* | 5/2006 | Widdowson et al. ...... 358/1.18 |
| 2008/0094420 A1 | 4/2008 | Geigel et al. |
| 2009/0309894 A1* | 12/2009 | Lam et al. ............... 345/582 |

FOREIGN PATENT DOCUMENTS

WO    WO 9945697 A1 *    9/1999    ........... H04N 1/40

* cited by examiner

*Primary Examiner* — Tize Ma
*Assistant Examiner* — Yu Chen
(74) *Attorney, Agent, or Firm* — VanCott, Bagley, Cornwall & McCarthy

(57) ABSTRACT

A method performed by a physical computing system for determining a layout of graphic objects (802) according to a layout density map (300) includes generating the layout density map (300), the layout density map (300) having low density regions (302) and high density regions (304); providing a set of candidate locations (402) within the layout density map (302), a number of the candidate locations (402) being equal to a number of the graphic objects (802), the candidate locations (402) being arranged away from the low density regions (302) and from other the candidate locations (402); and overlaying the layout density map (300) with the graphic objects (402), each graphic object (802) being disposed at one of the candidate locations (402).

16 Claims, 9 Drawing Sheets

DETERMINING A LAYOUT OF GRAPHIC OBJECTS ACCORDING TO A LAYOUT DENSITY MAP

BACKGROUND

Individuals and organizations are rapidly accumulating large collections of digital image content, including still images, text, graphics, animated graphics, and full-motion video images. This content may be presented individually or combined in a wide variety of different forms, including documents, catalogs, presentations, still photographs, commercial videos, home movies, and metadata describing one or more associated digital content files. As these collections grow in number and diversity, individuals and organizations experience an increasing demand for solutions for organizing and presenting the digital content in their collections. To meet this need, a variety of different systems and methods for organizing and presenting digital image content have been proposed.

For example, several digital image albuming systems enable users to create digital photo albums manually. These systems typically provide tools for organizing a collection of images and laying out these images on one or more pages. Among the common types of tools for manually creating a digital photo album are tools for selecting a subset of images in the collection that will appear on a page of an album, a graphical user interface for manually rearranging the images on the page, and basic image editing tools for modifying various characteristics, such as size and orientation, of the images that will appear in the album. Some users may find the process of generating a digital photo album using only manual digital image albuming systems to be tedious and time consuming.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
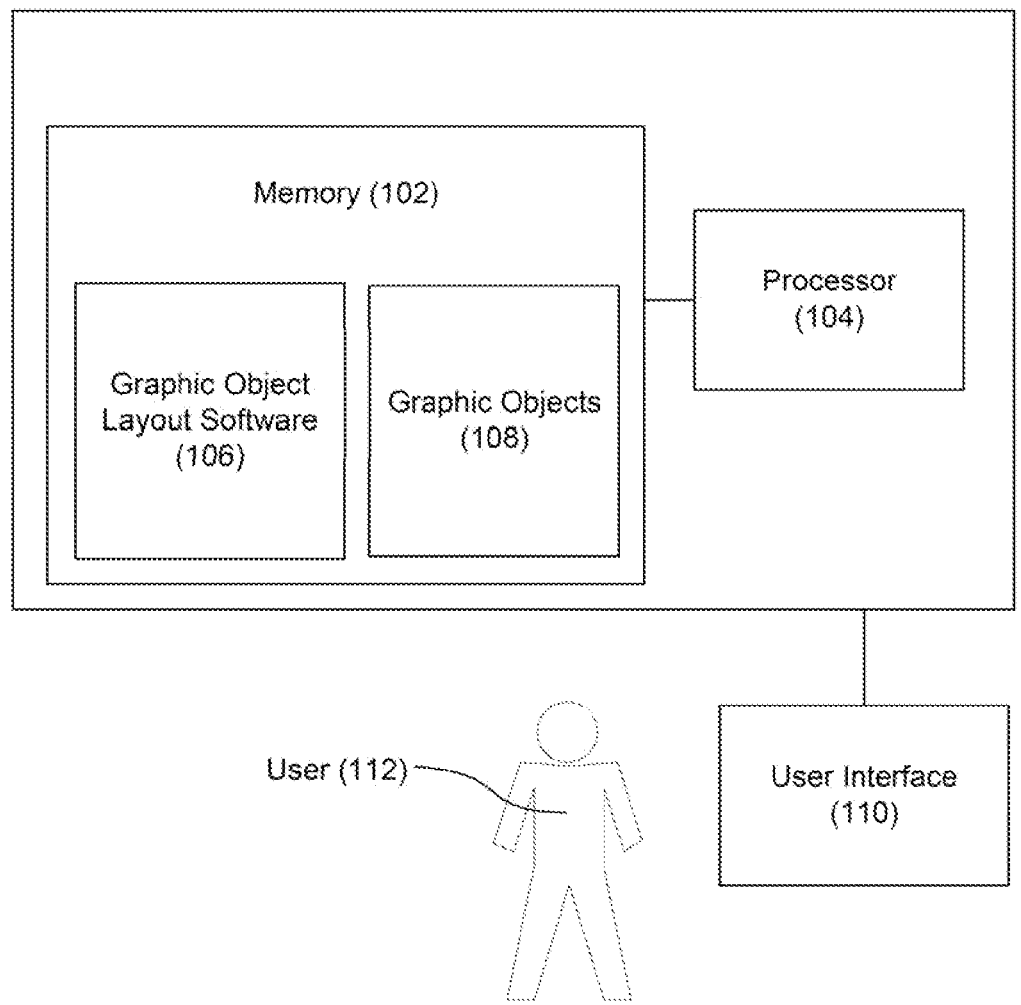
FIG. 1 is a diagram showing an illustrative graphic layout system capable of determining a layout of graphic objects on top of a background image, according to one embodiment of principles described herein.

Graphic layout software allows users to design and create layouts for graphic objects such as photos, text blocks, and other images. In certain graphic layout programs, a user is able to place several graphic objects onto a page over a background image. The background image may contain artwork which is meant to be displayed as part of the page design rather than being covered by a graphic object. The process of manually laying out graphic objects around the background art can be a difficult and/or time consuming task. For example, a user may spend a significant amount of time adjusting the size and position of several graphic objects on a single page in order to find an aesthetically acceptable arrangement.

Some graphic object layout software provides a user with a set of templates that allow a user to place various graphic objects at predetermined locations within a background image without covering up portions of the background image that are designed to be displayed as a part of the page. Although such templates may save a user some time, they are often inflexible in or limiting with regard to the number and location of graphic objects that may be placed on the page. Additionally many templates limit the aspect ratio of graphic objects used therewith, thereby forcing the user to crop a noncompliant graphic object in order to make it fit a predefined location on a page.

In light of these and other considerations, the present specification relates to systems and methods for providing a layout of graphic objects on a page. Using the systems and methods of the present specification, a number of graphic objects may be automatically arranged over a background image in such a way that the covering by the graphic objects of portions of the background image intended to be displayed is minimized or eliminated. Additionally, a layout of graphic objects may be created in which there is no background image, however the graphic objects are designed to take a certain shape. According to one illustrative embodiment, a layout density map may be generated for a given background image or desired shape. The layout density map may include low density regions where graphic objects are not to be placed and high density regions where graphic objects are meant to be placed. A halftone process may then be applied to the layout to determine candidate locations for graphic object placement in the background image, where more candidate locations are present in high density regions of the background image than in low density regions. Due to their placement within the high density regions, the candidate locations will be relatively close to the final locations of the graphic objects. The positions of the candidate locations may then be adjusted to obtain final locations for the graphic objects that optimize the appearance of the particular graphic objects being used. The graphic objects may then be overlaid on the background image at their respective final positions.

A computing system or graphic layout software embodying principles described herein may provide a user with a simple and effective way to achieve a layout of graphic objects over a background image or desired shape. Advantageously, the process of determining that layout may involve a low computational load and work with an arbitrary number of graphic objects. Additionally, the process may work with background images having irregularly shaped regions in which graphic objects are to be placed.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Throughout this specification and in the appended claims, the term "graphic layout system" is to be broadly interpreted as a computing system capable of arranging graphic objects on a page and displaying an arrangement of the graphic objects to a user.

Throughout this specification and in the appended claims, the term "graphic object" is to be broadly interpreted as an image that can be selectively arranged on a page using graphic layout software. A "graphic object" as defined herein may include, but is not limited to, a photographic image, a non-photographic image, and a block of text.

Throughout this specification and in the appended claims, the term "layout" is to be broadly interpreted as an arrangement of graphic objects on a page. The term "page" is to be broadly interpreted as a fixed area upon which a layout may be presented to a user. A page may refer to a physical medium or an electronic medium displayed to a user through a display device.

Throughout this specification and in the appended claims, the term "background image" is to be broadly interpreted as an image on a page upon which graphic objects may be overlaid. A background image within the scope of this definition may include photographic or non-photographic image.

Throughout this specification and in the appended claims, the term "layout density map" is to be broadly interpreted as classification of a background image into regions of different potential graphic object density. Thus, a layout density map may indicate high density regions of background image that correspond to areas of the background image where graphic objects are meant to be placed or where it would be aesthetically acceptable to place graphic objects. Conversely, low density regions of a layout density map correspond to areas of the background image where graphic objects are not meant to be placed.

Referring now to the figures, FIG. 1 is a diagram showing an illustrative graphic object layout system (100). According to one illustrative embodiment, a graphic layout system may include a processor (104), a user interface (110), and a memory (102) having graphic object layout software (106) and a number of graphic objects (108) stored thereon.

The graphic layout system (100) may be embodied as several different types of computing devices including, but not limited to, a laptop computer, a desktop computer, or a Personal Digital Assistant (PDA). The graphic layout system (100) may include a form of memory (102) including, but not limited to, a magnetic disk drive, a solid state drive, and/or an optical disc drive.

The graphic layout software (106) stored by the memory (102) may be embodied as computer readable code configured to cause a processor (104) to execute various instructions related to the layout of graphic objects (108) on a page.

A graphic object (108) may be any type of image including, but not limited to, a photo, a text block, or a piece of artwork. A collection of graphic objects (108) may include images imported from another memory medium as well as images designed and/or created with the graphic layout system (100).

The user interface (110) may enable interaction between the graphic object layout system (100) and a user (112). The user interface (110) may include a display device as well as an input receiving device such as a keyboard or a mouse. Through the user interface (110), a user (112) is able to send commands to the graphic layout system (100). These commands may involve the layout of graphic objects (108). Information about graphic objects (108) and their layout may be presented to the user (112) through the display device.

While interacting with the user interface, a user may instruct a computing system to determine a layout for a number of graphic objects on top of a background image.

Figure 2:
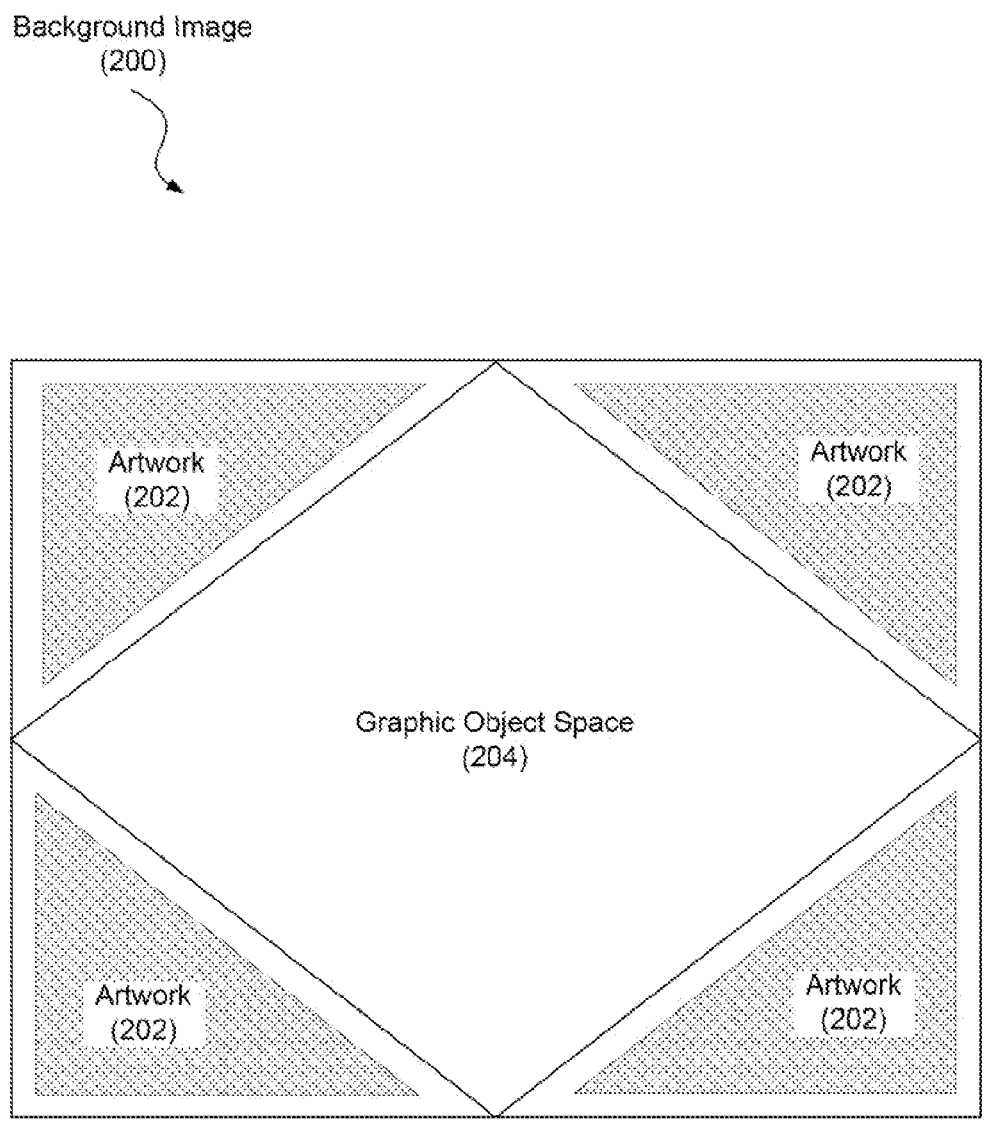
FIG. 2 is a diagram showing an illustrative background image on which to place graphic objects, according to one embodiment of principles described herein.

FIG. 2 is a diagram showing an illustrative background image on which to place graphic objects. According to one illustrative embodiment, a background image may include background artwork (202) and graphic object space (204).

A typical background image (200) may include a variety of artwork (202) laid out in a variety of locations. The subject of the artwork may correspond to the type of graphic objects to be placed along with the background image (200). For example, if a user desires to place a number of photographs of a ski trip, a background image having artwork of winter elements and winter sporting elements may be chosen. In some embodiments, a user may create original artwork (202) for placement within a background image (200).

The regions of a background image (200) where specific artwork (202) is not placed may be designated as graphic object space (204). Some background images (200) may contain little artwork (202) and a much graphic object space (204). Conversely, some background images (200) may contain much artwork (202) and little graphic object space (204). The precise shape of the graphic object space (204) may vary between background images (200). In some embodiments, there may be multiple regions of graphic object space (204) completely separated from each other by artwork (202).

A number of background images (200) may be included with a piece of graphic layout software. Additionally or alternatively, a user may be provided with the tools to allow him or her to create background images (200). During the process of creating background images, artwork may be created by a user or imported from other sources.

In the case of FIG. 2, the graphic object space (204) is presented as a diamond shape while the background artwork (202) is placed within the corners of the background image (200). The background image (200) and all other aspects associated therewith throughout this specification are shown by way of example and not of limitation. Any type of background image layout regarding artwork and graphic object space may be used.

As mentioned above, a graphic object layout system embodying principles described herein may allow a user to arrange graphic objects in the form of a specified shape or symbol. For example, a user may wish to place graphic objects in a circular shape, even if there is no background image.

Figure 3:
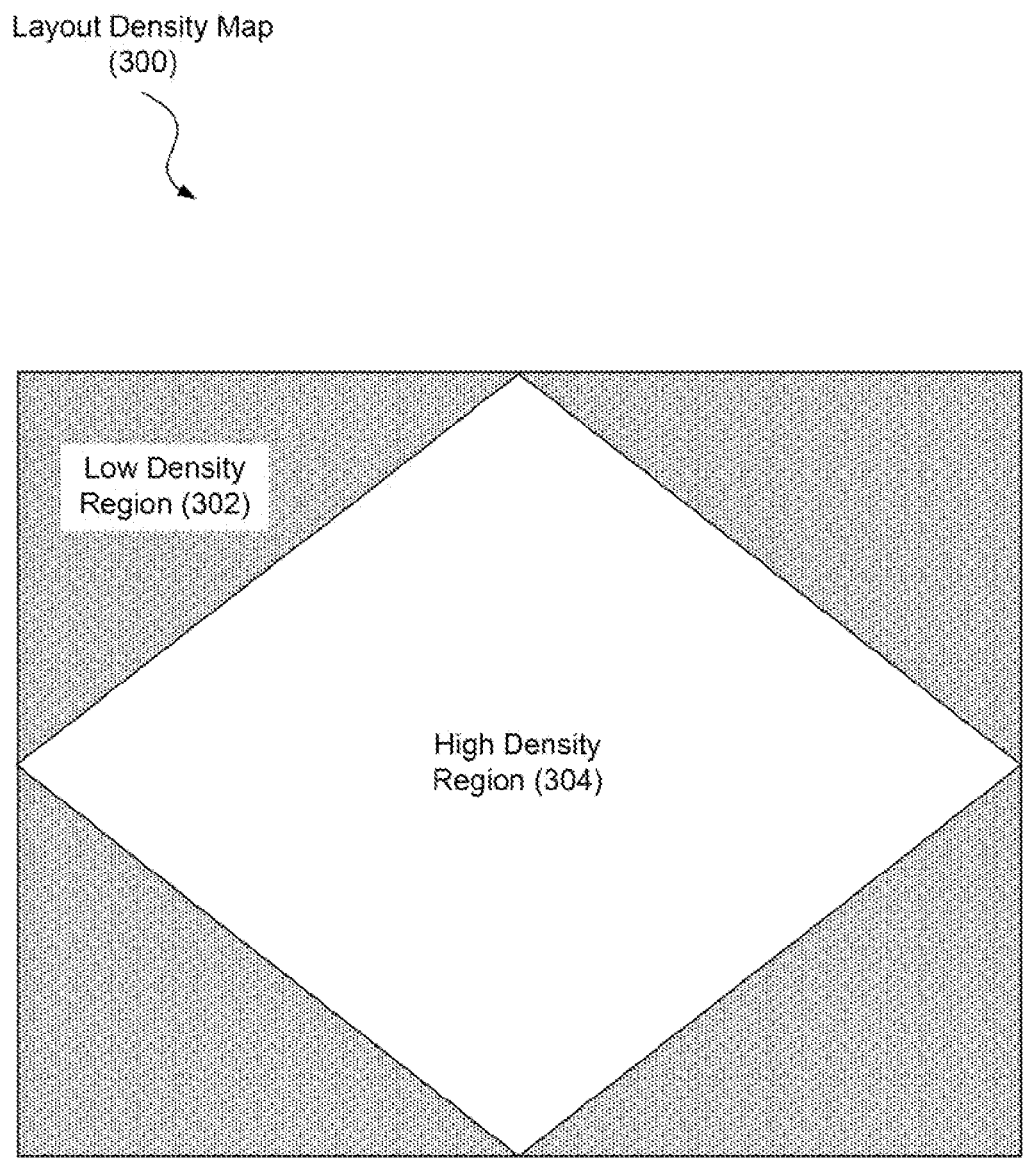
FIG. 3 is a diagram showing an illustrative layout density map to be used in association with the background, image shown in FIG. 2, according to one embodiment of principles described herein.

FIG. 3 is a diagram showing an illustrative layout density map to be used in association with the background image shown in FIG. 2. According to one illustrative embodiment, a layout density map (300) may include low density regions (302) and high density regions (304).

A layout density map may include certain regions designated as low density regions (302). The low density regions (302) may correspond to the regions of the background image which contain artwork. In some background images, there may be other areas where graphic objects are not meant to be placed. These areas may be designated as low density regions (302) as well.

A layout density map may also include certain regions designated as high density regions (304). The high density regions (304) may correspond to the regions of the background image where graphic objects are meant to be placed.

In one embodiment, the layout density map may be binary. In a binary layout density map, any given region will be designated as either a high density region (304) or a low density region (302). In some embodiments, the layout density map (300) may be graded. A graded layout density map may include density regions in between high and low. The gradient of a graded layout density map (300) may be either discrete or continuous.

In one embodiment, a layout density map (300) may be included with a predefined background image. Additionally or alternatively, a user may be provided with tools to create or modify a layout density map (300). This may be beneficial if there are certain regions within a background image which a user does not want to be covered with graphic objects, even if no artwork resides in that region.

A user may also use the provided tools to create a layout density for a desired shape or layout that is not meant to go with a background image. For example, a user may create a layout density map to create a triangular shaped layout of images. In a further example, a user may create a layout density map which will arrange a set of graphic objects to form a letter or other symbol.

After a layout density map has been associated with a background images, a number of candidate locations for graphic objects may be determined.

Figure 4:
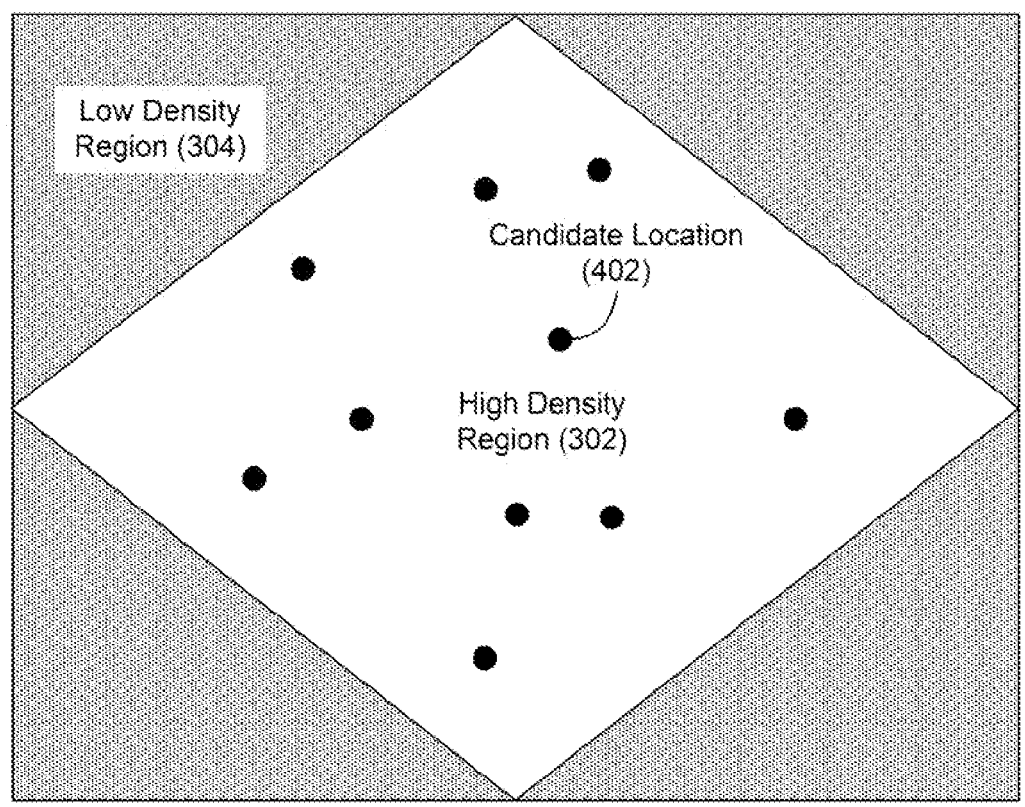
FIG. 4 is a diagram showing an illustrative initial position of candidate locations for graphic objects, according to one embodiment of principles described herein.

FIG. 4 is a diagram showing an illustrative position of initial candidate locations (400) for graphic objects. According to one illustrative embodiment, a set of candidate locations (402) may be placed within a high density region of the layout map.

In one embodiment, a halftone process may be used to determine the initial position of a set of candidate locations (402). Halftone processes are often used in various reprographic techniques. Printing an image with a halftone technique involves the use of dots. For darker shades, the dots are more abundant and are printed closer together. For lighter shades, fewer dots are used and are printed farther apart. Viewed from afar, a halftone image may appear to the human eye as different shades while in reality, all dots have the same shading but have different densities in different regions.

When a halftone process is applied to a layout density map, the number of dots will be higher in the regions of high density than the regions of low density. A variable within the halftone process may be adjusted so that few dots are created, even in the regions of high density. This variable may be referred to as the threshold value. The higher the threshold, the more dots will materialize. Conversely, a lower the threshold value will cause fewer dots to materialize. The threshold value may be adjusted based on the number of graphic objects a user desires to place within a layout. In some embodiments, if the halftone process produces too many dots, a user may lower the threshold values. Similarly, if the halftone process produces too few dots, then the user may increase the threshold value.

A halftone process may be configured to create the dots in random locations throughout higher density regions. Each dot created by the halftone process may represent a candidate location. A candidate location is a point on the graphic layout image which may be used as a center point for a graphic object.

When using a halftone process, it may not always be possible to generate the exact number of candidate locations as there are graphic objects to be placed within a layout. The halftone process may be configured to create a greater number of candidate locations than there are graphic objects to be placed within the layout. A dropping process may then be applied to remove whatever number of candidate locations is necessary so that the number of candidate locations is equal to the number of graphic objects to be placed within the layout.

Figure 5:
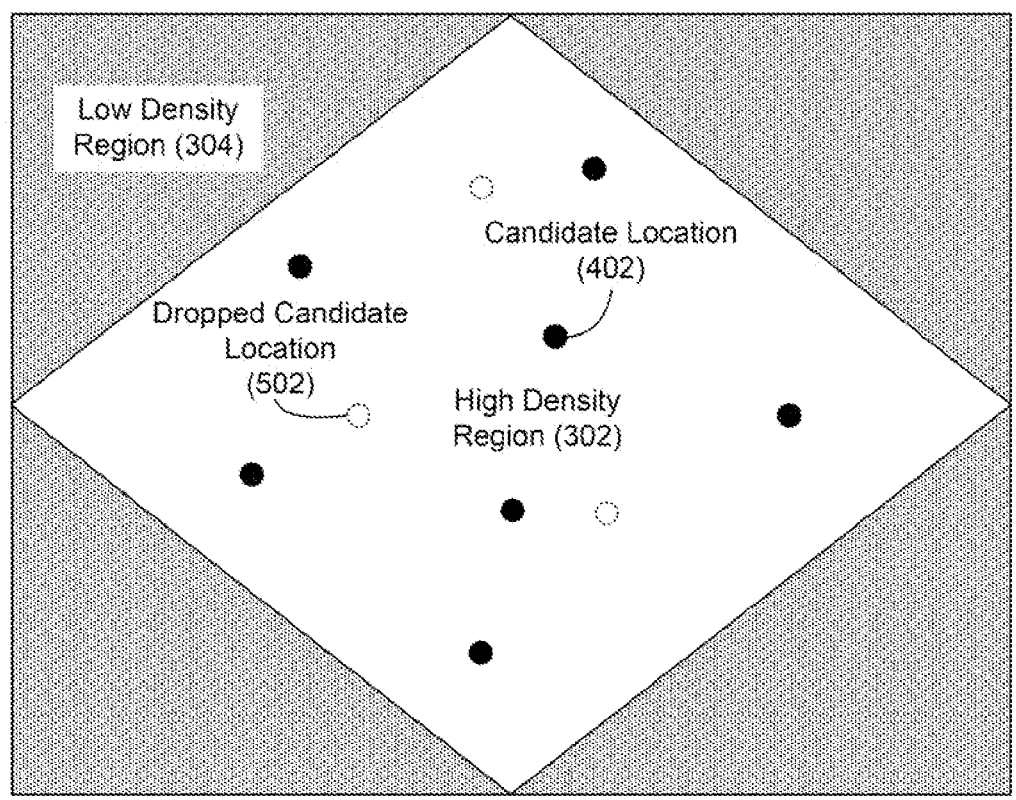
FIG. 5 is a diagram showing an illustrative layout with dropped candidate locations, according to one embodiment of principles described herein.

FIG. 5 is a diagram showing an illustrative layout with dropped candidate locations (500). According to one illustrative embodiment, a dropping process may be applied to remove the unnecessary candidate locations (502).

As mentioned above, the halftone process will generally create more candidate locations than there are graphic objects to be placed within the layout. A dropping process may then be used to drop the candidate locations having the smallest amount of distance between other candidate locations. For example, the halftone process may generate three more candidate locations than there are graphic objects. Each of the candidate locations may be placed randomly within the high density region. The three candidate locations (502) being the closest to other candidate locations may then be dropped. As will be appreciated by those skilled in the relevant art, a process may be developed to determine the distance between each candidate location and choose to remove the candidate locations which are closest to other candidate locations. Once the appropriate number of candidate locations is realized, the position of each candidate location may be adjusted.

Figure 6:
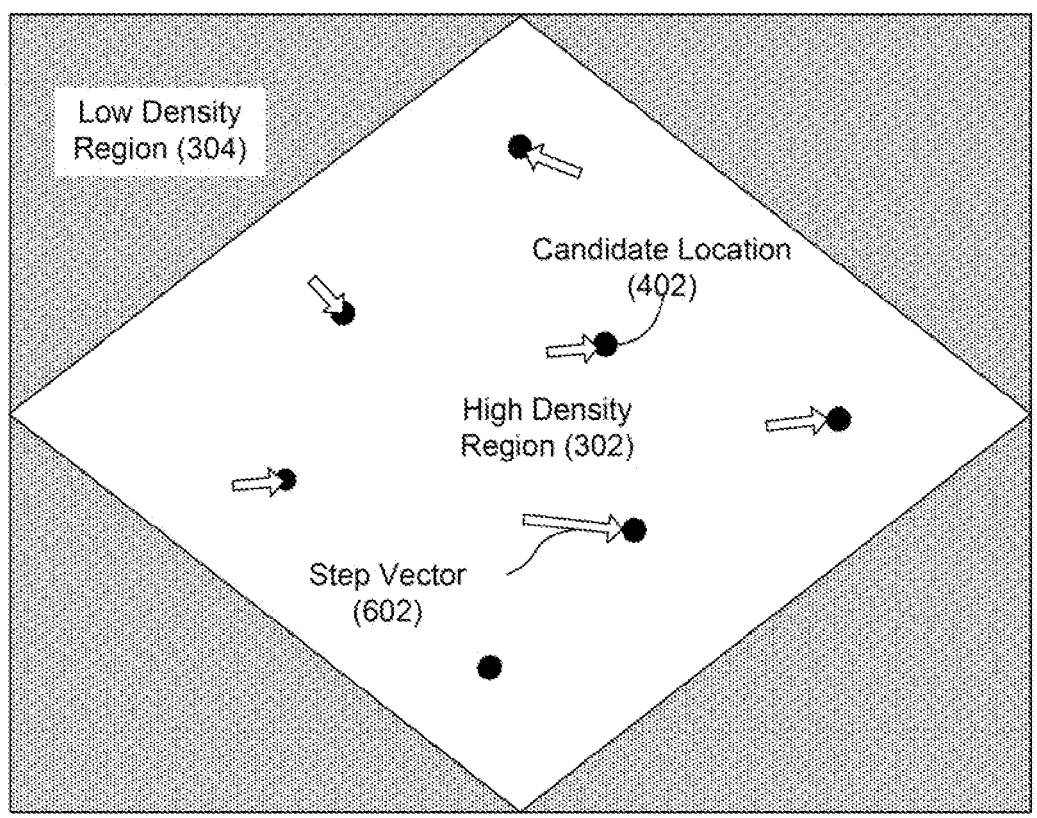
FIG. 6 is a diagram showing an illustrative layout with adjusted candidate locations, according to one embodiment of principles described herein.

FIG. 6 is a diagram showing an illustrative layout with adjusted candidate locations (600). According to one illustrative embodiment, the position of each candidate location (402) may be adjusted so that each candidate location (402) is at a sufficient distance from low density regions and other candidate locations.

In one embodiment, a process may be applied to move each candidate locations so that the distance between low density regions and other candidate locations is maximized. The process may be designed to simulate repelling forces. The process may be further configured to move a candidate location based on a step vector (602). The step vector (602) may determine the direction and the distance a particular candidate location is moved. The step vector (602) may depend on distance between low density regions and other candidate locations.

The step of moving a candidate location by a step vector may be repeated until the candidate location reaches an acceptable position. This position may be determined by reducing the size of the step vector in response to the candidate location oscillating. A candidate location may oscillate if the step vector reverses direction due to their being repelling forces on opposing sides of a candidate location. When the size of the step vector is reduced, the candidate location will move a smaller distance than it did previously. Once the step vector is reduced to a predetermined size, the position of the candidate location may be deemed satisfactory.

In general, it may be desired that each of the candidate locations is at a specific distance from other candidates and low density regions. This specific distance may depend on the number of graphic objects which are to be placed in the layout. For example, the more graphic objects to be placed into a graphic layout, the smaller the ideal distance between other candidate locations and low density regions, In some embodiments, a user may specify that some candidate locations be given more space within the layout. In this case, the process may take these factors into account. Those skilled in the familiar art may be able to develop the proper processes which take into account the appropriate constraints to accomplish the moving of candidate locations.

After the final position of each of the candidate locations has been determined, an overlaying area centered at each candidate location may be allocated.

Figure 7:
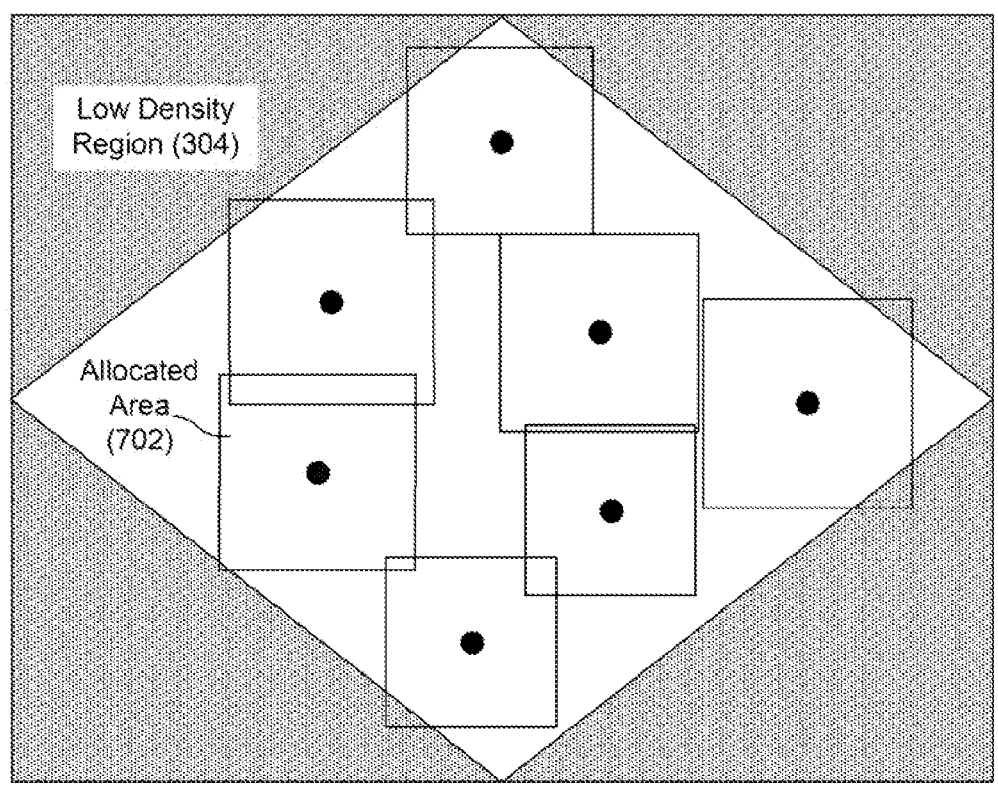
FIG. 7 is a diagram showing an illustrative layout with area allocated to the candidate locations, according to one embodiment of principles described herein.

FIG. 7 is a diagram showing an illustrative layout with area allocated to the candidate locations (700). According to one illustrative embodiment, an area may be allocated (702) to each candidate location.

The space allocated for each candidate location may be designed to reduce unused space on the page as well as reducing the overlapping of graphic objects. In one embodiment, the allocated area (702) for graphic objects may all be the same value. This value may be determined by the number of graphic objects to be placed into the layout. For example, the more graphic objects being placed into the layout, the smaller the areas for each graphic object may be assigned. In some embodiments, the amount of space allocated for each candidate location may depend on a set of constraints based on an assigned minimum or maximum area. The area allocated for each candidate location may also depend on the positioning of the candidate location relative to other candidate locations and low density areas.

In one embodiment, the area allocated to each candidate location may be the square of the average distance to the closest candidate points and low density regions. There may be several other factors which contribute to the amount of area assigned to each candidate location. Those skilled in the relevant art will be able to develop the proper processes to take a variety of factors into account.

After space has been allocated for each candidate location, each of the graphic objects assigned to the layout may be assigned to a particular candidate location. A final layout (800) may then be presented.

Figure 8:
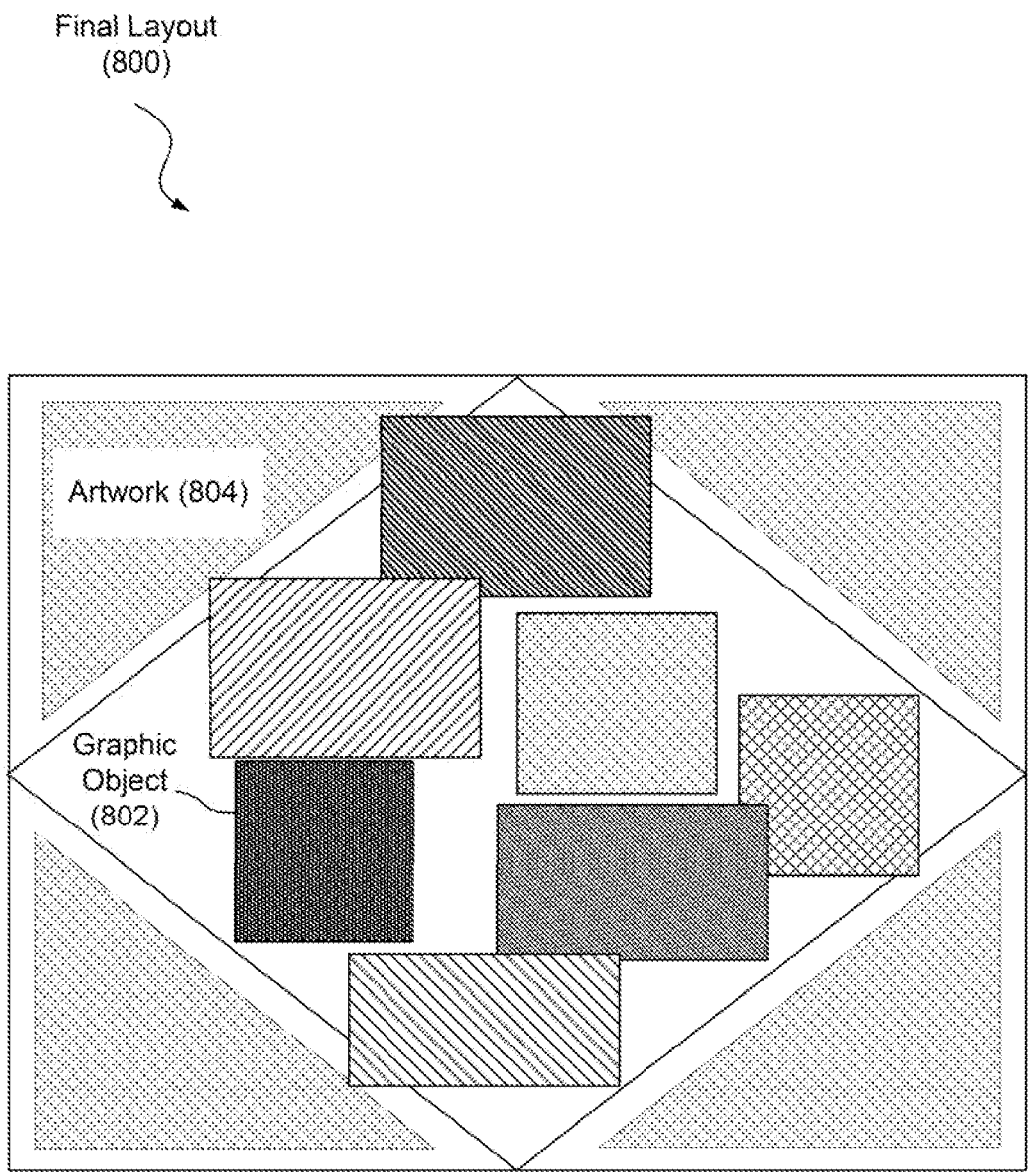
FIG. 8 is a diagram showing a final layout after graphic objects have been assigned to candidate locations, according to one embodiment of principles described herein.

FIG. 8 is a diagram showing a final layout (800) after graphic objects have been assigned to candidate locations. In one embodiment, the graphic objects (802) may be assigned to candidate locations randomly. Various processes may be used to randomly place graphic objects with certain candidate locations. In one embodiment, the graphic objects may be cropped to better fit the allocated space of the candidate location they are assigned to. Constraints may be applied to the cropping process to prevent too much of a graphic object from being cropped. In some embodiments, no cropping is performed.

In some embodiments, a user may manually assign each graphic object to a candidate location. Various tools associated with a piece of graphic layout software embodying principles described herein may allow a user to assign graphic objects.

In some embodiments, a matching process may be applied to match a graphic object to a candidate location. The matching may be based on a comparison between the dimensions of the graphic object and the difference in distance between vertical and horizontal distances to other candidate locations and low density regions. For example, if a candidate location has a shorter distance to candidate locations a vertical direction than in a horizontal direction, a graphic object with landscape dimensions may be a good fit for that candidate location. Conversely, if a candidate location has a shorter distance to candidate locations in a horizontal direction than in a vertical direction, a graphic object with portrait dimensions may be a better fit.

A computing system embodying principles described herein may allow a user to make adjustments to the final layout. For example, a user may modify the position of a graphic object. A user may also be able to swap a graphic object with another graphic object in the layout. If a user chooses to add or remove a graphic object from the final layout, the process of determining a final layout may then be repeated with the new set of graphic objects.

Figure 9:
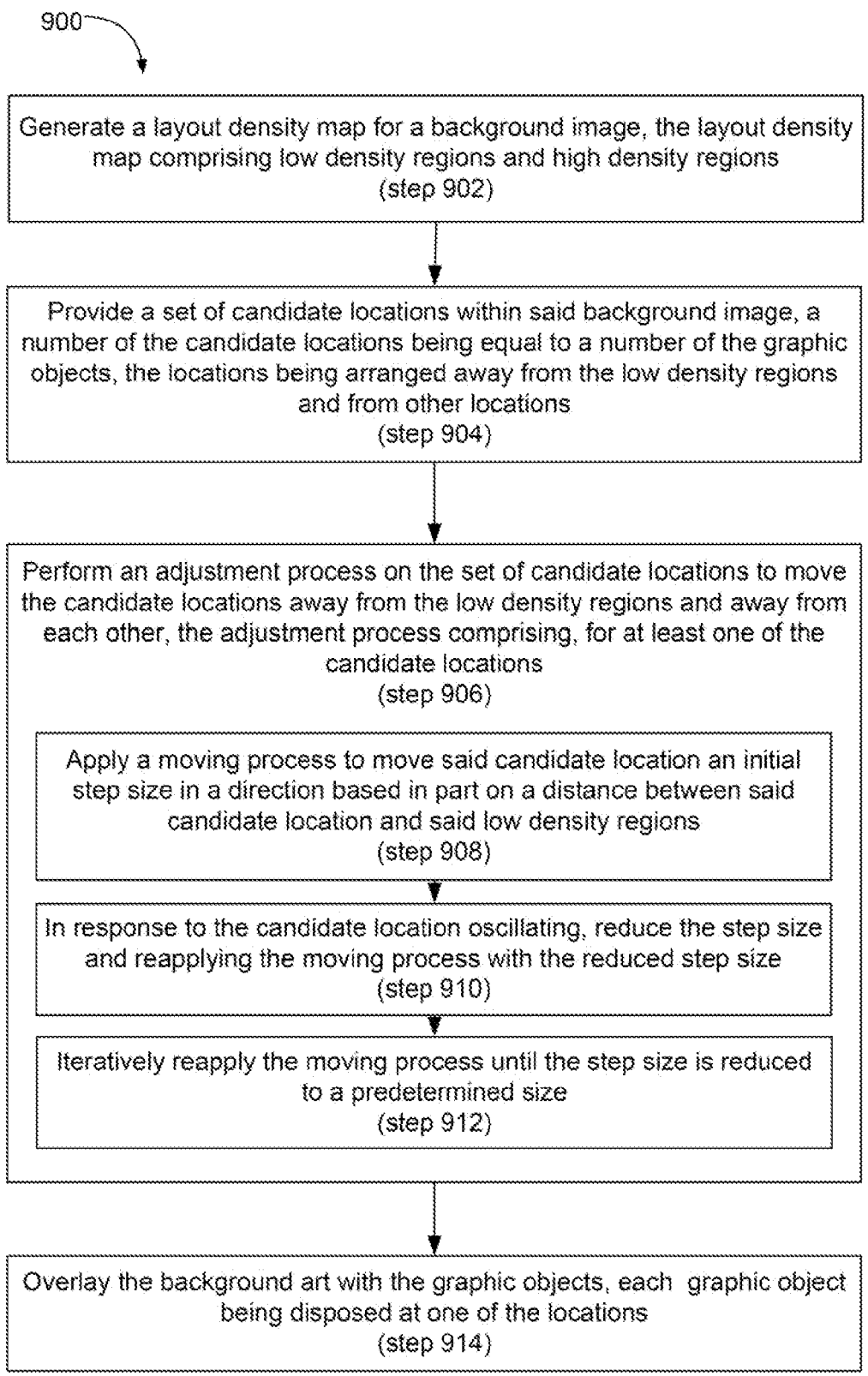
FIG. 9 is a flowchart showing an illustrative method for determining a layout for graphic objects on top of a background image, according to one embodiment of principles described herein.

FIG. 9 is a flowchart showing an illustrative method (900) for determining a layout for graphic objects on top of a background image. According to one illustrative embodiment, the method (900) includes generating (step 902) a layout density map for a background image, the layout density map including low density regions and high density regions, and providing (step 904) a set of candidate locations within the background image, a number of the candidate locations being equal to a number of the graphic objects, the locations being arranged away from the low density regions and from other the candidate locations.

In order to arrange the candidate locations, the method (900) may include performing (step 906) an adjustment process on the set of candidate locations to move the candidate locations away from the low density regions and away from each other, the adjustment process comprising, for at least one of the candidate locations, applying (step 908) a moving process to move the candidate location an initial step vector in a direction based in part on a distance between the candidate location and the low density regions, in response to the candidate location oscillating, reducing (step 910) the step vector and reapplying the moving process with the reduced step vector, and iteratively reapplying (step 912) the moving process until the step vector is reduced to a predetermined size. After the candidate locations have been appropriately arranged, the method may further include overlaying (step 914) the background image with the graphic objects, each the graphic object being disposed at one of the locations.

In sum, to provide a layout of graphic objects over a background image, a layout density map may be generated for a given background image. The layout density map may include low density regions where artwork is present and high density regions where graphic objects are meant to be placed. A halftone process may then be applied to the layout. A halftone process may produce more dots in high density regions than in low density regions. The dots may be used as candidate locations for graphic objects. Because the halftone process will place them within the high density regions, the candidate locations will be relatively close to their final positions. The positions of the candidate locations may then be adjusted. Once the candidate locations are in a final position, graphic objects may be assigned accordingly.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method performed by a physical computing system for determining a layout of graphic objects according to a layout density map, the method comprising:

generating said layout density map comprising low density regions and high density regions, said layout density map being based on a background image with portions comprising artwork, said low density regions of said layout density map corresponding to portions of said background image for which coverage by said graphic objects is being minimized;

providing a set of candidate locations within said layout density map, a number of said candidate locations being equal to a number of said graphic objects, said candidate locations being arranged away from said low density regions and from other said candidate locations;

overlaying said layout density map with said graphic objects, each said graphic object being disposed at one of said candidate locations;

applying a halftone function to said layout density map to create an initial set of candidate locations;

applying a dropping function to eliminate extra candidate locations in response to there being more said candidate locations than said graphic objects; and adjusting said halftone function to increase said number of said initial set of candidate locations in response to there being fewer said candidate locations than said graphic objects;

wherein said layout density map is a graded layout density map with density regions designated over a range between high and low density in which said density regions are either discrete or continuous.

2. The method of claim 1, in which providing said set of candidate locations within said layout density map comprises:

performing an adjustment process on said set of candidate locations to move said candidate locations away from said low density regions and away from each other, said adjustment process comprising, for at least one of said candidate locations:

applying a moving process to move said candidate location according to an initial step vector based in part on a distance between said candidate location and said low density regions;

iteratively reapplying said moving process until said step vector is reduced to a predetermined size; and in response to said candidate location oscillating, reducing said step vector and reapplying said moving process with said reduced step vector.

3. The method of claim 2, in which said step vector is further based on at least one of a specific density of said low density regions and a position of an alternate candidate location.

4. The method of claim 1, further comprising allocating an overlay area to each said candidate location.

5. The method of claim 1, further comprising assigning a graphic object to a candidate location based on at least one of: a random assignment, a selection made by a user of said physical computing system, and an aspect ratio of said graphic object.

6. A computing system for determining a layout of graphic objects comprising:

a processor; and a memory having graphic layout software stored thereon; in which, said graphic layout software is configured to cause said processor to, upon execution of said graphic layout software:

generate a layout density map comprising low density regions and high density regions, said layout density map being based on a background image with portions comprising artwork, said low density regions of said layout density map corresponding to portions of said background image for which coverage by said graphic objects is being minimized;

apply a halftone function to said layout density map to create an initial set of candidate locations within said layout density map, a number of said candidate locations being equal to a number of said graphic objects, said candidate locations being arranged away from said low density regions and from other said candidate locations identify; and overlay said layout density map with said graphic objects, each said graphic object being disposed at one of said candidate locations;

apply a dropping function to eliminate extra candidate locations in response to there being more said candidate locations than said graphic objects; and adjust said halftone function to increase said number of said initial set of candidate locations in response to there being fewer said candidate locations than said graphic objects;

wherein said layout density map is a graded layout density map with density regions designated over a range between high and low density in which said density regions are either discrete or continuous.

7. The computing system of claim 6, in which to provide said set of candidate locations within said layout density map, said processor is further configured to:

perform an adjustment function on said set of candidate locations to move said candidate locations away from said low density regions and away from each other, said adjustment process comprising, for at least one of said candidate locations:

apply a moving function to move said candidate location by an initial step vector based in part on a distance between said candidate location and said low density regions;

iteratively reapply said moving function until said step vector is reduced to a predetermined size; and in response to said candidate location oscillating, reduce said step vector and reapplying said moving function with said reduced step vector.

8. The computing system of claim 7, in which said step vector is further based on at least one of: a specific density of said low density regions and a position of an alternate candidate location.

9. The computing system of claim 6, in which said high density regions and said low density regions in said layout density map define a shape in which said graphic objects are to be arranged according to said layout density map.

10. The computing system of claim 6, in which said processor is further configured to allocate an overlay area to each said candidate location.

11. The computing system of claim 6, in which said processor is further configured to assign a graphic object to a candidate location based on at least one of: a random assignment, a selection made by a user of said computing system, and an aspect ratio of said graphic object.

12. The computing system of claim 6, wherein said graphic objects comprise a number of photographic images.

13. The computing system of claim 6, further comprising a user interface with user input tools to modify the layout density map.

14. The computing system of claim 6, in which said processor is further configured to allocate an area to each candidate location to contain a corresponding graphic object, said area being defined by a square of an average distance to closest other candidate points and low density regions.

15. A computer program product for providing a layout for graphic objects, said computer program product comprising:

a non-transitory computer readable storage medium having computer readable code embodied therewith, said computer readable program code comprising:

computer readable program code configured to:

generate a layout density map comprising low density regions and high density regions, said layout density map being based on a background image with portions comprising artwork, said low density regions of said layout density map corresponding to portions of said background image for which coverage by said graphic objects is being minimized;

apply a halftone process to identify a set of candidate locations within said layout density map at which graphic objects may be placed, a number of said candidate locations being equal to a number of said graphic objects, said candidate locations being arranged away from said low density regions and from other said candidate locations; and overlay said layout density map with said graphic objects, each said graphic object being disposed at one of said candidate locations;

apply a dropping function to eliminate extra candidate locations in response to there being more said candidate locations than said graphic objects; and adjust said halftone function to increase said number of said initial set of candidate locations in response to there being fewer said candidate locations than said graphic objects;

wherein said layout density map is a graded layout density map with density regions designated over a range between high and low density in which said density regions are either discrete or continuous.

16. The computer program product of claim 15, further comprising an adjustable threshold value that determines how many candidate locations will be identified by said halftoning process.

* * * * *

UNITED STATES PATENT AND TRADEMARK OFFICE
CERTIFICATE OF CORRECTION

PATENT NO.        : 9,024,965 B2                                              Page 1 of 1
APPLICATION NO.   : 13/501269
DATED             : May 5, 2015
INVENTOR(S)       : Xuemei Zhang et al.

It is certified that error appears in the above-identified patent and that said Letters Patent is hereby corrected as shown below:

In the Claims

In column 10, line 3, in Claim 6, delete "locations identify;" and insert -- locations; --, therefor.

Signed and Sealed this
Tenth Day of November, 2015

Michelle K. Lee
*Director of the United States Patent and Trademark Office*